United States Patent
Jozwiak et al.

(10) Patent No.: US 11,148,643 B2
(45) Date of Patent: Oct. 19, 2021

(54) WINDSHIELD WIPER ASSEMBLY

(71) Applicant: GM Global Technology Operations LLC, Detroit, MI (US)

(72) Inventors: Thomas W. Jozwiak, Southgate, MI (US); Thomas W. Cox, Almont, MI (US); Marek L. Wilmanowicz, Pinckney, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 16/569,141

(22) Filed: Sep. 12, 2019

(65) Prior Publication Data

US 2021/0078541 A1  Mar. 18, 2021

(51) Int. Cl.
*B60S 1/40* (2006.01)
*B60S 1/38* (2006.01)
*B60S 1/34* (2006.01)

(52) U.S. Cl.
CPC . *B60S 1/40* (2013.01); *B60S 1/34* (2013.01); *B60S 1/38* (2013.01); *B60S 1/3801* (2013.01); *B60S 2001/3812* (2013.01); *B60S 2001/3813* (2013.01); *B60S 2001/3824* (2013.01)

(58) Field of Classification Search
CPC ...... B60S 1/40; B60S 1/34; B60S 1/38; B60S 1/3801; B60S 1/3879; B60S 2001/3824; B60S 2001/3812; B60S 2001/3813

USPC ............. 15/250.23, 250.44, 250.361
See application file for complete search history.

(56) References Cited

U.S. PATENT DOCUMENTS

| | | | | |
|---|---|---|---|---|
| 4,698,874 A | * | 10/1987 | Fritz, Jr. | B60S 1/38 15/250.48 |
| 5,301,384 A | * | 4/1994 | Perry | B60S 1/38 15/250.04 |
| 5,384,932 A | * | 1/1995 | Battlogg | B60S 1/34 15/250.23 |
| 2015/0336542 A1 | * | 11/2015 | Sauter | B60S 1/38 15/250.29 |

FOREIGN PATENT DOCUMENTS

| | | | |
|---|---|---|---|
| DE | 102012224481 | * | 7/2014 |
| FR | 2727369 | * | 5/1996 |

* cited by examiner

*Primary Examiner* — Gary K. Graham

(57) ABSTRACT

A windshield wiper assembly for an automobile, comprising a wiper arm, a wiper blade, a plurality of double claw fixtures pivotally mounted onto the wiper arm and adapted to support the wiper blade on the wiper arm, and an actuator adapted to selectively induce rotation of the wiper blade along a longitudinal axis of the wiper blade relative to the wiper arm, each of the double claw fixtures adapted to rotatably support the wiper blade.

18 Claims, 12 Drawing Sheets

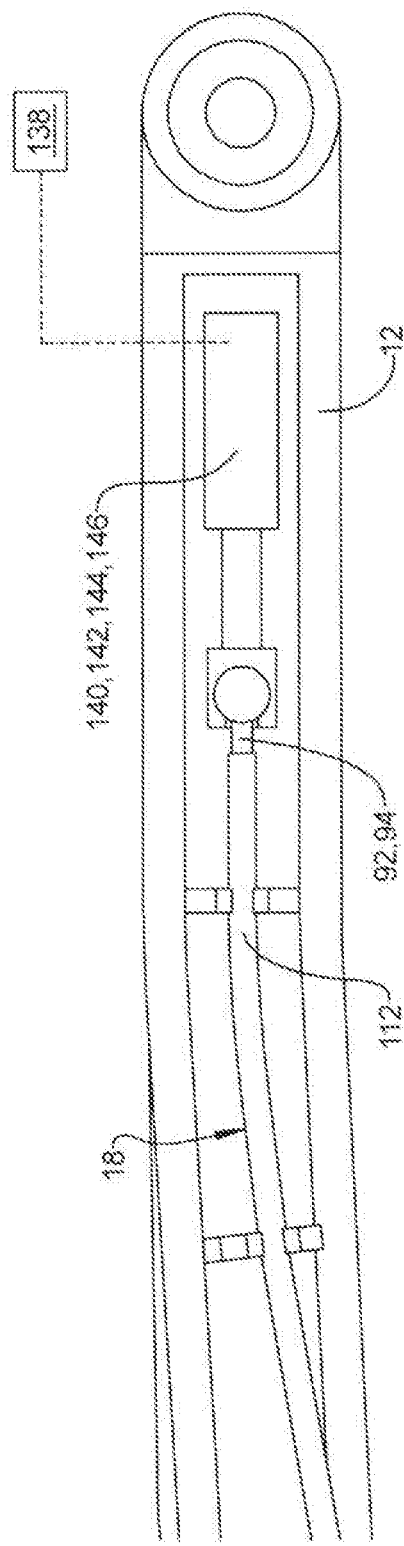

WINDSHIELD WIPER ASSEMBLY

INTRODUCTION

The present disclosure relates to a windshield wiper assembly for an automobile. More specifically, the present invention is a windshield wiper assembly that has the ability to selectively or automatically change the attack angle of the wiper blade relative to the surface of the windshield.

Windshield with variable curvature across the surface present the problem of not providing a consistent attack angle between the wiper blade and the surface of the windshield. Keeping the wiper blade at an appropriate attack angle is important to ensure effective wiping of liquid from the surface of the windshield. If the attack angle is too small, the wiper blade will not effectively remove liquid from the surface of the windshield. If the attack angle is too big, the wiper may bounce across the surface of the windshield. Current windshield wipers incorporate wiper blades with a fixed attack angle. When a windshield wiper blade with a fixed attack angle is used on a windshield with variable curvature profile, the problems discussed above may be an issue.

Thus, while current windshield wipers achieve their intended purpose, there is a need for a new and improved windshield wiper assembly that has the ability to selectively or automatically change the attack angle of the wiper blade relative to the surface of the windshield.

SUMMARY

According to several aspects of the present disclosure, a windshield wiper assembly for an automobile comprises a wiper arm, a wiper blade, a plurality of double claw fixtures pivotally mounted onto the wiper arm and adapted to support the wiper blade on the wiper arm, and an actuator adapted to selectively induce rotation of the wiper blade along a longitudinal axis of the wiper blade relative to the wiper arm, each of the double claw fixtures adapted to rotatably support the wiper blade.

According to another aspect, the wiper blade has first and second distal ends, the actuator adapted to selectively twist the first and second distal ends of the wiper blade, inducing rotation of the wiper blade along a longitudinal axis relative to the wiper arm.

According to another aspect, the actuator includes a first push rod having a first distal end engaging the first distal end of the wiper blade and a second push rod having a first distal end engaging the second distal end of the wiper blade, wherein the actuator is adapted to push the first push rod toward the first distal end of the wiper blade and to push the second push rod toward the second distal end of the wiper blade, inducing rotation of the wiper blade along a longitudinal axis relative to the wiper arm.

According to another aspect, the first distal end of the wiper blade includes a first twist block and the second distal end of the wiper blade includes a second twist block, the first distal end of the first push rod in sliding engagement with the first twist block and the first distal end of the second push rod in sliding engagement with the second twist block, wherein movement of the first distal end of the first push rod relative to the first twist block induces rotation of the first twist block and the first distal end of the wiper blade and movement of the first distal end of the second push rod relative to the second twist block induces rotation of the second twist block and the second distal end of the wiper blade.

According to another aspect, each of the double claw fixtures defines a first channel and a second channel, the first channel adapted to slidably and rotatably support the wiper blade, the second channel adapted to accommodate the first and second push rods.

According to another aspect, the first and second twist blocks each include opposing ramped portions, the first distal end of the first push rod engaging the ramped portions of the first twist block and the first distal end of the second push rod engaging the ramped portions of the second twist block.

According to another aspect, the second channel within each of the double claw fixtures is adapted to slidably support the first and second push rods and to prevent rotation of the first and second push rods relative to the wiper arm, further wherein when the first distal end of the first push rod engages the ramped portions of the first twist block, the first twist block rotates relative to the first distal end of the first push rod, and when the first distal end of the second push rod engages the ramped portions of the second twist block, the second twist block rotates relative to the first distal end of the second push rod.

According to another aspect, the actuator further includes a lever hub pivotally mounted to the wiper arm between the first and second distal ends of the wiper blade, the lever hub including a first lever arm extending from the lever hub and a second lever arm extending from the lever hub, opposite the first lever arm, a second distal end of the first push rod pivotally attached to the first lever arm and a second distal end of the second push rod pivotally attached to the second lever arm, the actuator further including a third push rod having a first distal end pivotally attached to the first lever arm, wherein when the third push rod slides toward the lever hub the lever hub rotates and the first lever arm pushes the first push rod toward the first distal end of the wiper blade and the second lever arm pushes the second push rod toward the second distal end of the wiper blade.

According to another aspect, the first distal end of the third push rod is removably attached to the first lever arm of the lever hub.

According to another aspect, the first distal end of the third push rod is secured to the first lever arm of the lever hub by a pin, the pin being secured therein by one of a c-clip and a cotter pin.

According to another aspect, the first distal end of the third push rod includes a rubber boot adapted to removably cover the lever hub and the pivotal attachments of the second distal end of the first push rod to the first lever arm, the second distal end of the second push rod to the second lever arm, and the first distal end of the third push rod to the first lever arm.

According to another aspect, the actuator is adapted to automatically induce rotation of the wiper blade based on movement of the wiper arm.

According to another aspect, the actuator further includes a cam mechanism in engagement with a second distal end of the third push rod, wherein the cam mechanism induces movement to the third push rod as the windshield wiper arm moves during operation of the windshield wiper assembly.

According to another aspect, the actuator is adapted to selectively induce rotation of the wiper blade independently of movement of the wiper arm.

According to another aspect, the windshield wiper assembly further includes a programmable controller, the controller adapted to control the actuator and the rotational position of the wiper blade relative to the wiper arm.

According to another aspect, the actuator includes an electrical linear actuator adapted to selectively induce linear movement to the second distal end of the third push rod.

According to another aspect, the actuator includes one of an electric, hydraulic and pneumatic cylinder adapted to selectively induce linear movement to the second distal end of the third push rod.

According to another aspect, the wiper blade includes metallic splines extending longitudinally from a first distal end of the wiper blade to the second distal end of the wiper blade, the actuator including a first electric coil positioned on the wiper arm adjacent the first distal end of the wiper blade and a second electric coil positioned on the wiper arm adjacent the second distal end of the wiper blade, the first and second electric coils adapted to induce a twist to the first and second distal ends of the wiper blade, inducing rotation of the wiper blade along a longitudinal axis relative to the wiper arm.

According to another aspect, the windshield assembly further includes a plurality of intermediate electric coils spaced along the wiper arm adjacent the wiper blade between the first and second electric coils, each of the first, second and the plurality of intermediate electric coils adapted to induce a twist to the wiper blade and, collectively, induce rotation of the wiper blade along a longitudinal axis relative to the wiper arm.

According to another aspect, each of the double claw fixtures defines a first channel and a second channel, the first channel adapted to slidably and rotatably support the wiper blade, the second channel adapted to accommodate the first, second and intermediate electric coils.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 10 is a perspective view of a portion of a wiper arm in accordance with an exemplary embodiment, wherein the actuator is one of an electric, hydraulic and pneumatic cylinder.

DETAILED DESCRIPTION

The following description is merely exemplary in nature and is not intended to limit the present disclosure, application, or uses.

Figure 1:
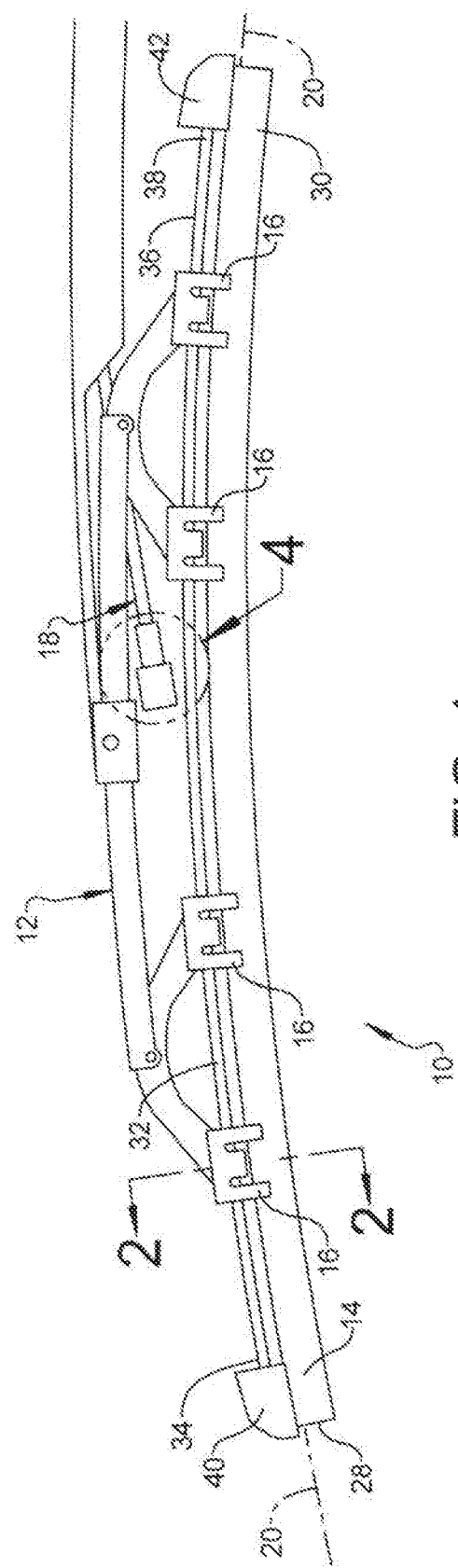
FIG. 1 is a side view of a windshield wiper assembly according to an exemplary embodiment of the present disclosure.

Referring to FIG. 1, a windshield wiper assembly 10 for an automobile according to the present disclosure comprises a wiper arm 12, and a wiper blade 14. A plurality of double claw fixtures 16 are pivotally mounted onto the wiper arm 12 and support the wiper blade 14 on the wiper arm 12. An actuator 18 is adapted to selectively induce rotation of the wiper blade 14 along a longitudinal axis 20 of the wiper blade 14 relative to the wiper arm 12. Each of the double claw fixtures 16 is adapted to rotatably support the wiper blade 14.

Figure 2:
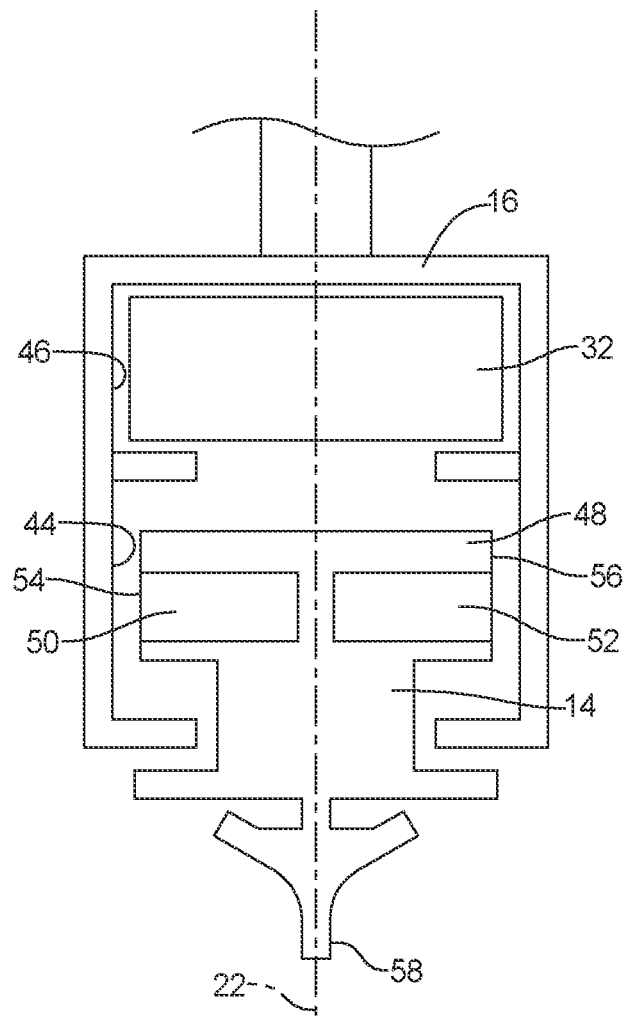
FIG. 2 is a sectional view of a windshield wiper assembly taken along line 2-2 of FIG. 1, wherein the wiper blade is aligned with a vertical axis through the wiper arm.
Figure 3:
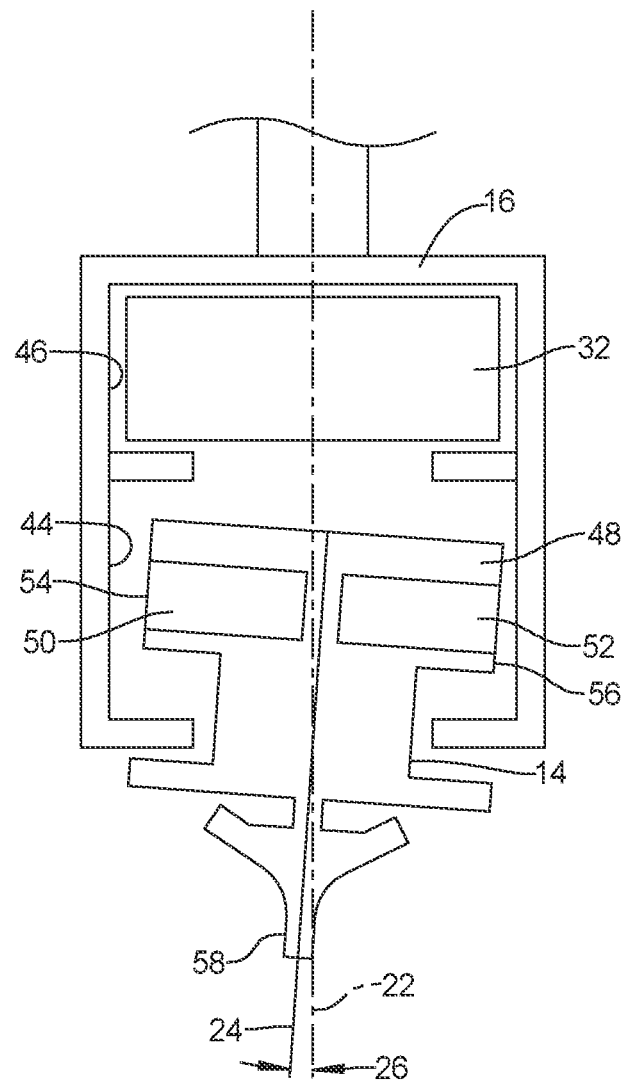
FIG. 3 is a sectional view of a windshield wiper assembly taken along line 2-2 of FIG. 1, wherein the wiper blade is aligned with an axis at an angle relative to a vertical axis through the wiper arm.

Referring to FIG. 2, the default position for the wiper blade 14 is when the wiper blade 14 is aligned with a vertical axis 22 through the wiper arm 12. The actuator 18 causes the wiper blade 14 to rotate relative to the wiper arm 12. Referring to FIG. 3, the actuator 18 rotates the wiper blade 14 so the wiper blade 14 is aligned along an axis 24 that is at an angle 26 relative to the vertical axis 22 through the wiper arm 12.

Referring again to FIG. 1, the wiper blade 14 has first and second distal ends 28, 30. The actuator 18 is adapted to selectively twist the first and second distal ends 28, 30 of the wiper blade 14, inducing rotation of the wiper blade 14 along a longitudinal axis 20 relative to the wiper arm 12.

The actuator 18 includes a first push rod 32 having a first distal end 34 engaging the first distal end 28 of the wiper blade 14 and a second push rod 36 having a first distal end 38 engaging the second distal end 30 of the wiper blade 14. The actuator 18 is adapted to push the first push rod 32 toward the first distal end 28 of the wiper blade 14 and to push the second push rod 36 toward the second distal end 30 of the wiper blade 14.

The first distal end 28 of the wiper blade 14 includes a first twist block 40 attached thereto. The second distal end 30 of the wiper blade 14 includes a second twist block 42 attached thereto. The first distal end 34 of the first push rod 32 slidingly engages the first twist block 40 and the first distal end 38 of the second push rod 36 slidingly engages the second twist block 42. When the first push rod 32 is pushed toward the first distal end 28 of the wiper blade 14, sliding movement of the first distal end 34 of the first push rod 32 relative to the first twist block 40 induces rotation of the first twist block 40 and the first distal end 28 of the wiper blade 14. When the second push rod 36 is pushed toward the second distal end 30 of the wiper blade 14, sliding movement of the first distal end 38 of the second push rod 36 relative to the second twist block 42 induces rotation of the second twist block 42 and the second distal end 30 of the wiper blade 14.

Referring again to FIG. 2 and FIG. 3, each of the double claw fixtures 16 defines a first channel 44 and a second channel 46. The first channel 44 is adapted to slidably and rotatably support the wiper blade 14. The wiper blade includes a base 48 that includes a pair of splines 50, 52. A first spline 50 is embedded within the base 48 and runs longitudinally along the entire length of the wiper blade 14 adjacent a first side 54 of the wiper blade 14. A second spline 52, is embedded within the base 48 and runs longitudinally along the entire length of the wiper blade 14 adjacent a second side 56 of the wiper blade 14. The first and second splines 50, 52 are made from a flat, semi-rigid metallic material to ensure the spline provide support and still allows slight bending of the wiper blade 14.

The wiper blade 14 further includes a blade tip 58 extending from the base 48. The blade tip 58 is adapted to contact the windshield of an automobile. As shown in FIG. 3, the base 48 of the wiper blade 14 is slidingly and rotatably supported within the first channel 44 of each double claw fixture 16. The first channel 44 of each double claw fixture 16 includes clearance around the base 48 of the wiper blade 14 to allow the wiper blade 14 to rotate within the first channel.

The second channel 46 of each double claw fixture 16 is adapted to accommodate one of the first and second push rods 32, 36. The first and second push rods 32, 36 are sized to fit within the second channel 46 with enough clearance fit to allow the first and second push rods 32, 36 to freely slide therein. However, the clearance fit is not enough to allow rotation of the first and second push rods 32, 36 within the second channel 46.

In the exemplary embodiment shown in FIG. 2 and FIG. 3, the first and second push rods 32, 36 are rectangular in shape, and are slidingly supported within substantially rectangular shaped second channels 46 in the double claw fixtures 16. The second channel 46 provides a pathway to guide the first and second push rods 32, 36 and to allow the first and second push rods 32, 36 to freely slide therein while restricting the first and second push rods 32, 36 from rotation.

Figure 5A:
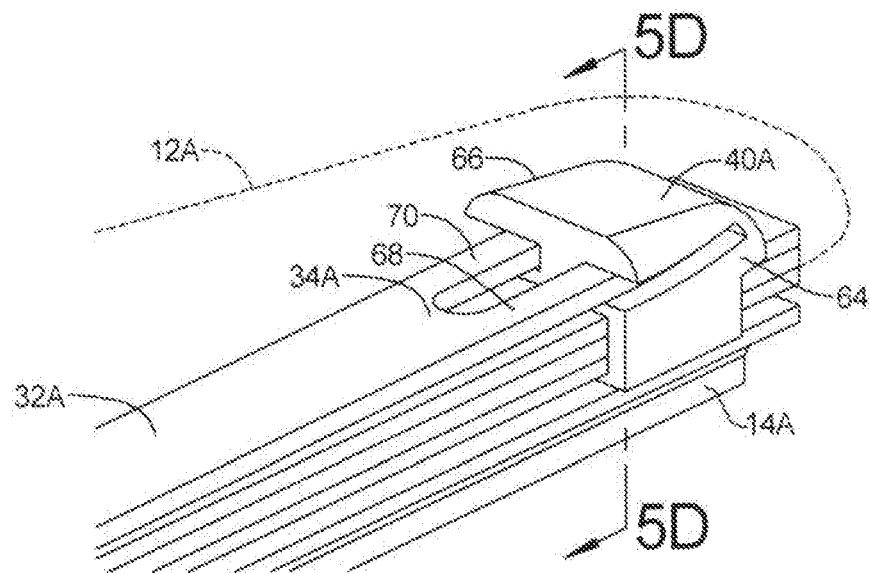
FIG. 5A is a perspective view of a twist block and push rod in accordance with an exemplary embodiment.
Figure 5B:
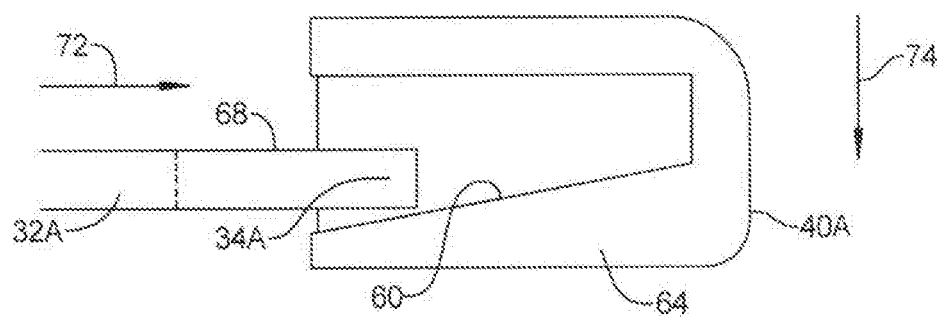
FIG. 5B is a schematic side view of a first side of the twist block shown in FIG. 5A.
Figure 5C:
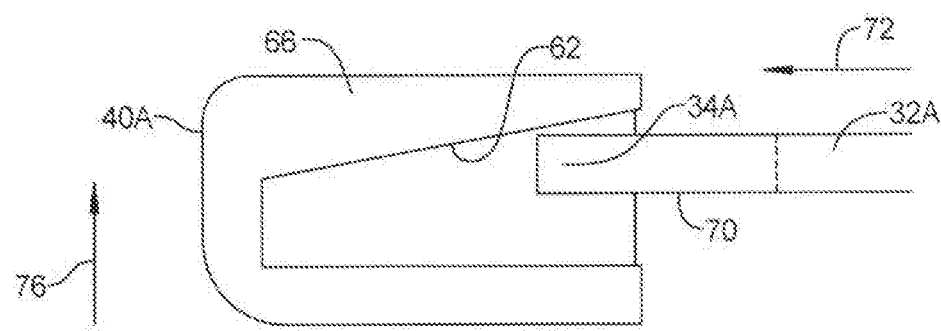
FIG. 5C is a schematic side view of a second side of the twist block shown in FIG. 5A.

Referring to FIG. 5A, a wiper arm 12A, a wiper blade 14A, a first twist block 40A and a first push rod 32A according to an exemplary embodiment of the present disclosure are shown. The first twist block 40A includes opposing ramped portions 60, 62. Referring to FIG. 5B, a first side 64 of the first twist block 40A includes a first ramped portion 60, angled upward. Referring to FIG. 5C, a second side 66 of the first twist block 40A includes a second ramped portion 62, angled downward. The first distal end 34A of the first push rod 32A, as shown in this exemplary embodiment, includes a forked end defining a first finger 68 and a second finger 70. The first finger 68 engages the first ramped portion 60 formed within the first side 64 of the first twist block 40A. The second finger 70 engages the second ramped portion 62 formed within the second side 66 of the first twist block 40A.

Figure 5D:
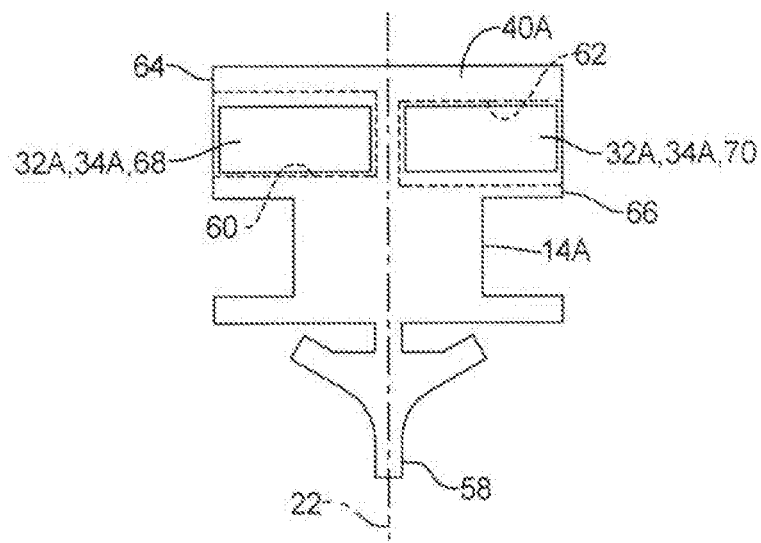
FIG. 5D is a schematic sectional view taken along line 5D-5D in FIG. 5A, wherein the push rod has not been pushed into the twist block, and the twist block is not rotated relative to the push rod.
Figure 5E:
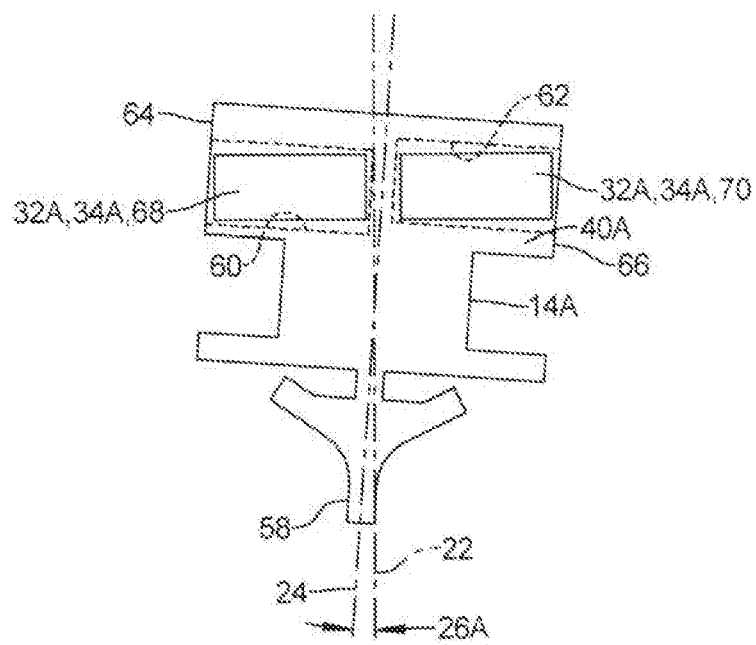
FIG. 5E is a schematic sectional view taken along line 5D-5D in FIG. 5A, wherein the actuator has pushed the push rod into the twist block to rotate the twist block relative to the push rod.

When the first push rod 32A is not actuated, the first and second fingers 68, 70 engage the first and second ramped portions 60, 62 of the first twist block 40A and the wiper blade 14A is aligned with a vertical axis 22A through the wiper arm 12A, as shown in FIG. 5D.

As the first push rod 32A pushes into the first twist block 40A, as indicated by arrow 72, the first ramped portion 60 pushes the first finger 68 upward. The second channels 46 within the double claw fixtures 16 prevent rotation of the first push rod 32A, so the first side 64 of the first twist block 40A is forced downward, as indicated by arrow 74, as shown in FIG. 5B. As the first push rod 32A pushes into the first twist block 40A, as indicated by arrow 72, the second ramped portion 62 pushes the second finger 70 downward. The second channels 46 within the double claw fixtures 16 prevent rotation of the first push rod 32A, so the second side 66 of the first twist block 40A is forced downward, as indicated by arrow 76, as shown in FIG. 5C.

Simultaneously forcing the first side 64 of the first twist block 40A down and forcing the second side 66 of the first twist block 40A up causes the first twist block 40A to rotate. Rotation of the first twist block 40A causes rotation of the wiper blade 14A relative to the vertical axis 22A through the wiper arm 12A, orienting the wiper blade 14A at an angle 26A relative to the vertical axis 22A through the wiper arm. A second twist block and second push rod (not shown) substantially identical to the first twist block 40A and first push rod 32A simultaneously twist the wiper blade 14A at an opposite end.

Figure 6:
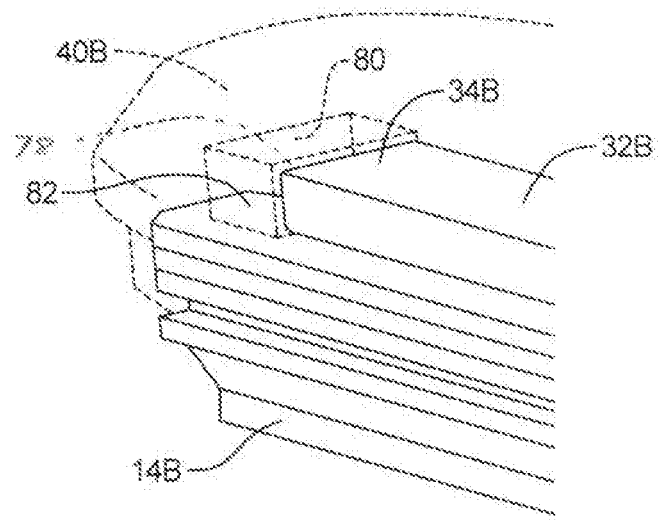
FIG. 6 is a perspective view of a twist block and push rod in accordance with another exemplary embodiment.

Referring to FIG. 6, a wiper arm 12B, a wiper blade 14B, a first twist block 40B and a first push rod 32B according to another exemplary embodiment of the present disclosure are shown. The twist block 40B defines a slot 78 with contoured upper and lower surfaces 80, 82. As the first push rod 32B is pushed into the slot 78, the upper and lower warped surfaces 80, 82 push upward on one side of the first push rod 32B and push downward on the opposite side of the first push rod 32B, causing the twist block 40B to rotate relative to the first push rod 32B.

Figure 4:
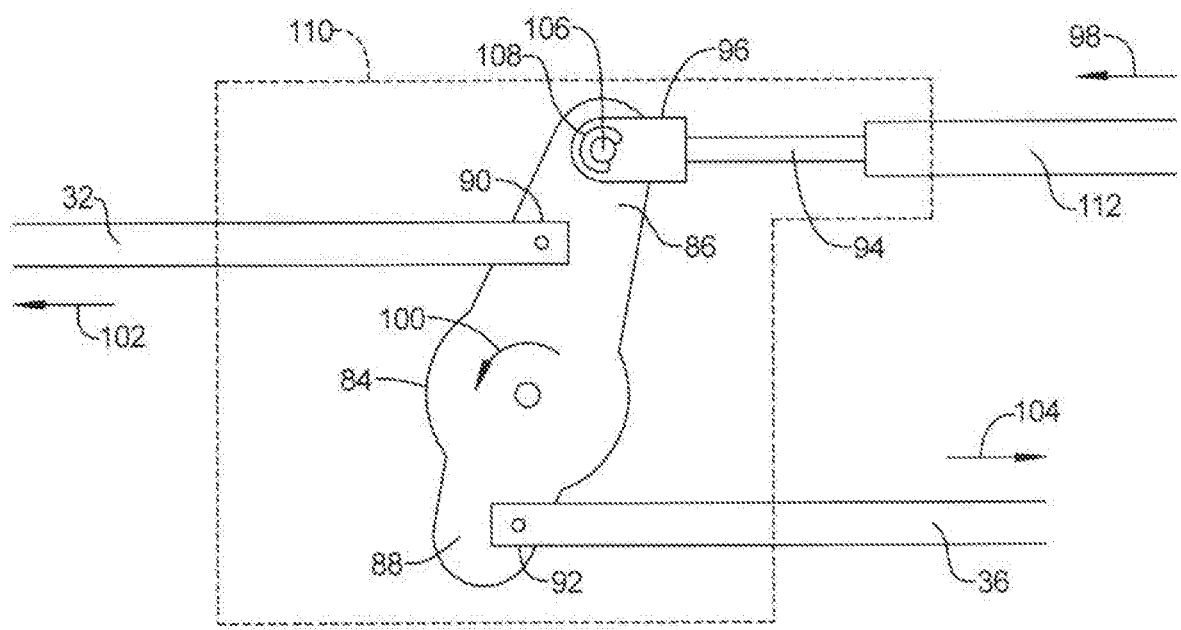
FIG. 4 is an enlarged view of a portion of FIG. 1, as indicated in FIG. 1.

Referring to FIG. 4, the first and second push rods 34, 36 are simultaneously pushed by a lever hub 84 pivotally mounted to the wiper arm 12 between the first and second distal ends 28, 30 of the wiper blade 14. The lever hub 84 includes a first lever arm 86 extending from the lever hub 84 and a second lever arm 88 extending from the lever hub 84, opposite the first lever arm 86. A second distal end 90 of the first push rod 32 is pivotally attached to the first lever arm 86 and a second distal end 92 of the second push rod 36 is pivotally attached to the second lever arm 88.

The actuator 18 further includes a third push rod 94 having a first distal end 96 pivotally attached to the first lever arm 86. When the third push rod 94 slides toward the lever hub 84, as indicated by arrow 98, the lever hub rotates, as indicated by arrow 100. The first lever arm 86 pushes the first push rod 32 toward the first distal end 28 of the wiper blade 14, as indicated by arrow 102, and the second lever arm 88 pushes the second push rod 36 toward the second distal end 30 of the wiper blade 14, as indicated by arrow 104.

Referring again to FIG. 4, in an exemplary embodiment, the first distal end 96 of the third push rod 94 is removably attached to the first lever arm 86 of the lever hub 84. This allows the wiper blade 14 to be removed from the wiper arm 12 for replacement or repair. The third push rod 94 is secured to the first lever arm 86 of the lever hub 84 by a pin 106. The pin 106 may be secured therein by a c-clip 108, as shown, or by a cotter pin or other suitable device.

In an exemplary embodiment, the first distal end 96 of the third push rod 94 includes a rubber boot 110 adapted to removably cover the lever hub 84 and the pivotal attachments of the second distal end 90 of the first push rod 32 to the first lever arm 86, the second distal end 92 of the second push rod 36 to the second lever arm 88, and the first distal end 96 of the third push rod 94 to the first lever arm 86.

The third push rod 94 may be any suitable shape or material adapted to push the first lever arm 86 of the lever hub 84 to actuate the first and second push rods 32, 36. As shown, the third push rod 94 is a substantially rigid cable supported within a tubular housing 112. The tubular housing 112 is supported on the wiper arm 12 and provides a pathway to route the third push rod 94 to the first lever arm 86 of the lever hub 84. The rubber boot 110 is attached to the tubular housing 112 and removably envelopes the lever hub 84 and the pivotal attachments of the second distal end 90 of the first push rod 32 to the first lever arm 86, the second distal end 92 of the second push rod 36 to the second lever arm 88, and the first distal end 96 of the third push rod 94 to the first lever arm 86.

Figure 7:
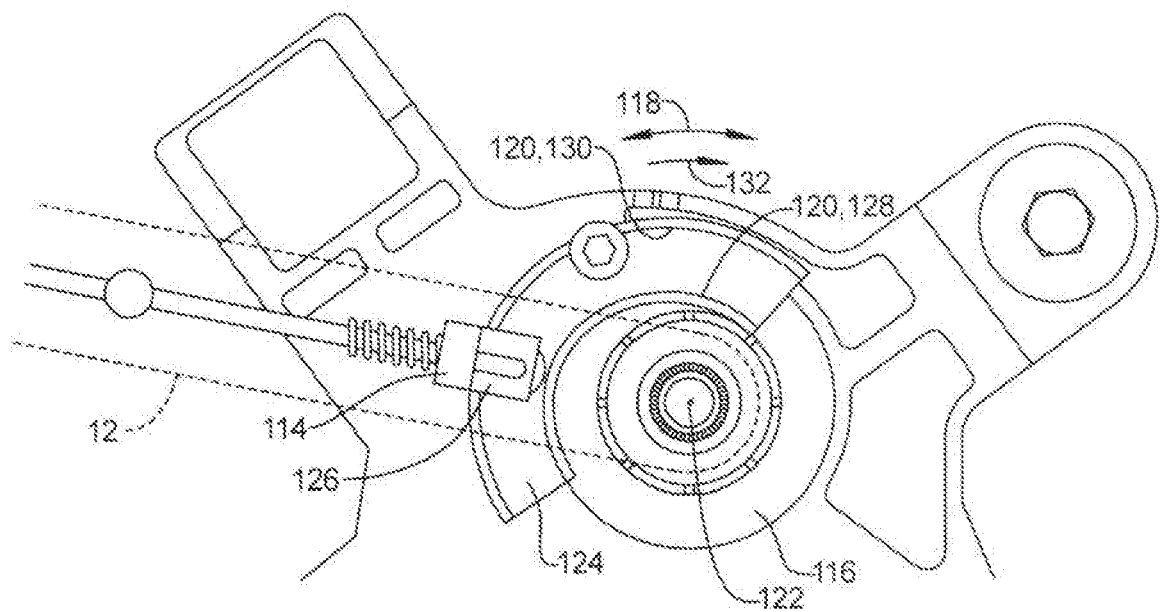
FIG. 7 is a perspective view of a cam mechanism for an actuator according to an exemplary embodiment.
Figure 8:
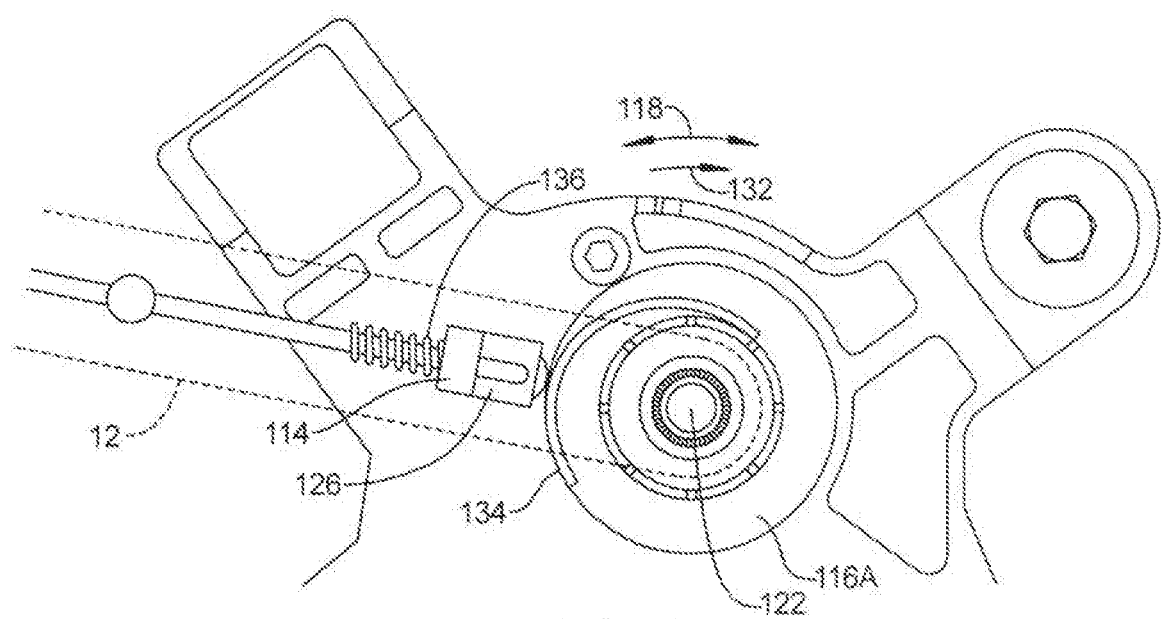
FIG. 8 is a perspective view of a cam mechanism for an actuator according to another exemplary embodiment.

Referring now to FIG. 7 and FIG. 8, in an exemplary embodiment of the present disclosure, the actuator 18 is adapted to automatically induce rotation of the wiper blade 14 based on movement of the wiper arm 12. The third push rod 94 includes a second distal end 114 that engages a cam mechanism 116. As the wiper arm 12 moves back and forth radially, as indicated by arrow 118, the second distal end 114 of the third push rod 94 follows a cam surface 120 that pushes against the second distal end 114 of the third push rod 94. The wiper arm 12 rotates about a pivot axis 122. The distance from the pivot axis 122 to the cam surface 120 varies, whereby the distance that the cam surface 120 pushes the second distal end 114 of the third push rod 94 varies depending on where the wiper arm 12 is located.

Referring specifically to FIG. 7, in one exemplary embodiment, the cam surface 120 of the cam mechanism 116 comprises a cam channel 124. The second distal end 114 of the third push rod 94 includes a follower 126. The follower 126 is positioned within the cam channel 124, and is either pushed by a radially outer surface 128 of the cam channel 124, or pulled by a radially inner surface 130 of the cam channel 124, as the wiper arm 12 moves.

As shown in FIG. 7, the follower 126 is positioned within the cam channel 124 at a point where the cam channel 124 is spaced furthest from the pivot axis 122. In this position, the third push rod 94 is pushed away from the pivot axis 122, toward the lever hub 84. The first and second push rods 32, 36 are pushed outward toward the distal ends 28, 30 of the wiper blade 14, and the first and second twist blocks 40, 42 have the wiper blade 14 rotated, as shown in FIG. 3. As the wiper arm 12 moves counterclockwise, as indicated by arrow 132, the follower 126 moves within the cam channel 124 and the cam channel 124 gets closer to the pivot axis 122, and pulls the third push rod 94 away from the lever hub 84, toward the pivot axis 122. The first and second push rods 32, 36 are pulled inward away from the distal ends 28, 30 of the wiper blade 14, and the first and second twist blocks 40, 42 return to a position wherein the twist blocks 40, 42 and the wiper blade 14 are aligned with the vertical axis 22 through the wiper arm 12, as shown in FIG. 2.

Referring specifically to FIG. 8, in another exemplary embodiment, the second distal end 114 of the third push rod 94 includes a follower 126. The follower 126 is positioned in engagement with a radially outwardly facing cam surface 134. A spring 136 is attached to the second distal end 114 of the third push rod 94 and to the wiper arm 12. The spring 136 pushes the second distal end 114 of the third push rod 94 toward the pivot axis 122, pulling the third push rod 94 toward the pivot axis 122, and keeps the follower 126 in engagement with the radially outwardly facing cam surface 134. The follower 126 is either pushed by the radially outwardly facing cam surface 134, or pulled by the spring 136, as the wiper arm 12 moves.

As shown in FIG. 8, the follower 126 is positioned against the radially outward facing cam surface 134 at a point where the radially outward facing cam surface 134 is spaced furthest from the pivot axis 122. In this position, the third push rod 94 is pushed away from the pivot axis 122, toward the lever hub 84. The first and second push rods 32, 36 are pushed outward toward the distal ends 28, 30 of the wiper blade 14, and the first and second twist blocks 40, 42 have the wiper blade 14 rotated, as shown in FIG. 3. As the wiper arm 12 moves counterclockwise, as indicated by arrow 132, the distance between the radially outward facing cam surface 134 and the pivot axis 122 becomes smaller. The spring 136 biases the follower 126 against the radially outward facing cam surface 134, wherein as the distance between the radially outward facing cam surface 134 shrinks, the third push rod 94 is pulled away from the lever hub 84, toward the pivot axis 122. The first and second push rods 32, 36 are pulled inward away from the distal ends 28, 30 of the wiper blade 14, and the first and second twist blocks 40, 42 return to a position wherein the twist blocks 40, 42 and the wiper blade 14 are aligned with the vertical axis 22 through the wiper arm 12, as shown in FIG. 2.

Referring now to FIG. 10, in another exemplary embodiment, the actuator 18 is adapted to selectively induce rotation of the wiper blade 14 independently of movement of the wiper arm 12. The windshield wiper assembly 10 includes a programmable controller 138.

The controller 138 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "nontransitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The controller 138 controls the actuator 18 and the rotational position of the wiper blade 14 relative to the wiper arm 12. In an exemplary embodiment, an electrical linear actuator 140 pushes or pulls the second distal end 114 of the third push rod 94 in response to input from the controller 138. As shown in FIG. 10, the actuator 18 includes one of an electric cylinder 142, a hydraulic cylinder 144 and a pneumatic cylinder 146, mounted to the wiper arm 12 and adapted to selectively induce linear movement to the second distal end 114 of the third push rod 94 based on input from the controller 138.

Figure 9A:
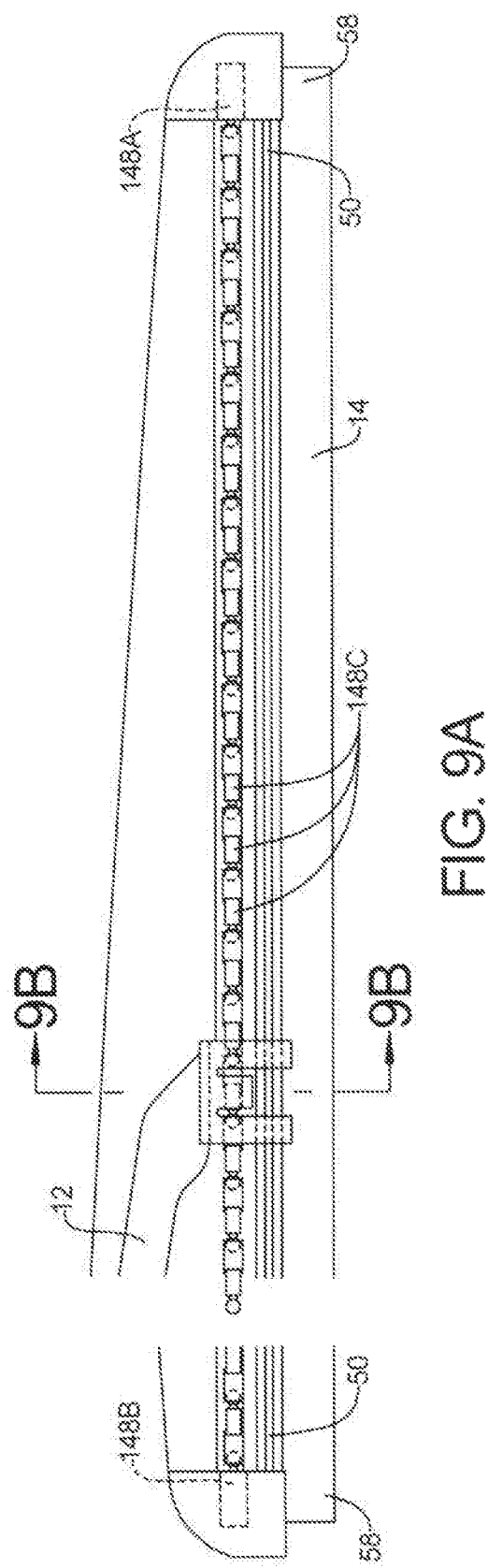
FIG. 9A is perspective view of a wiper blade and a plurality of electrical coils.
Figure 9B:
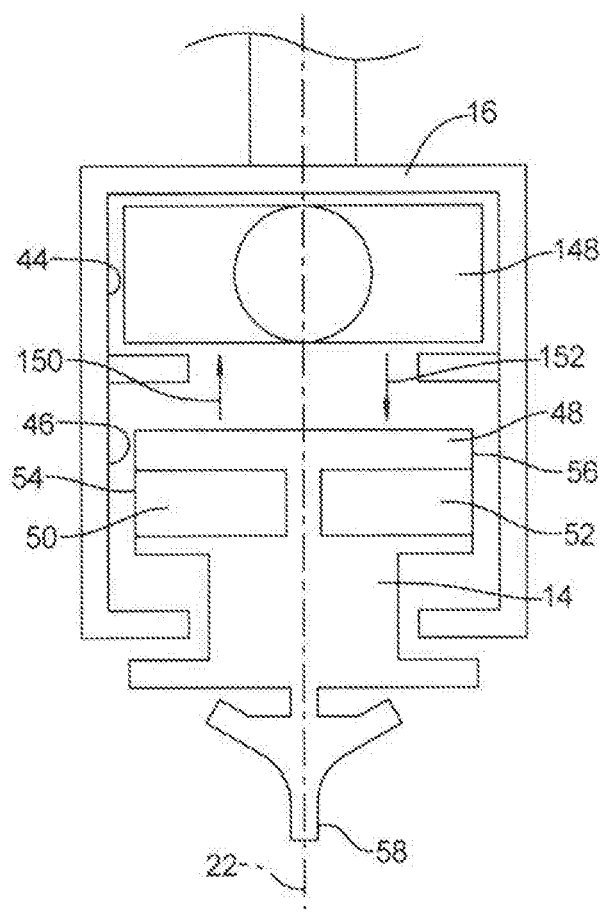
FIG. 9B is a sectional view taken along line 9B-9B in FIG. 9A, wherein the wiper blade is aligned with a vertical axis through the wiper arm.
Figure 9C:
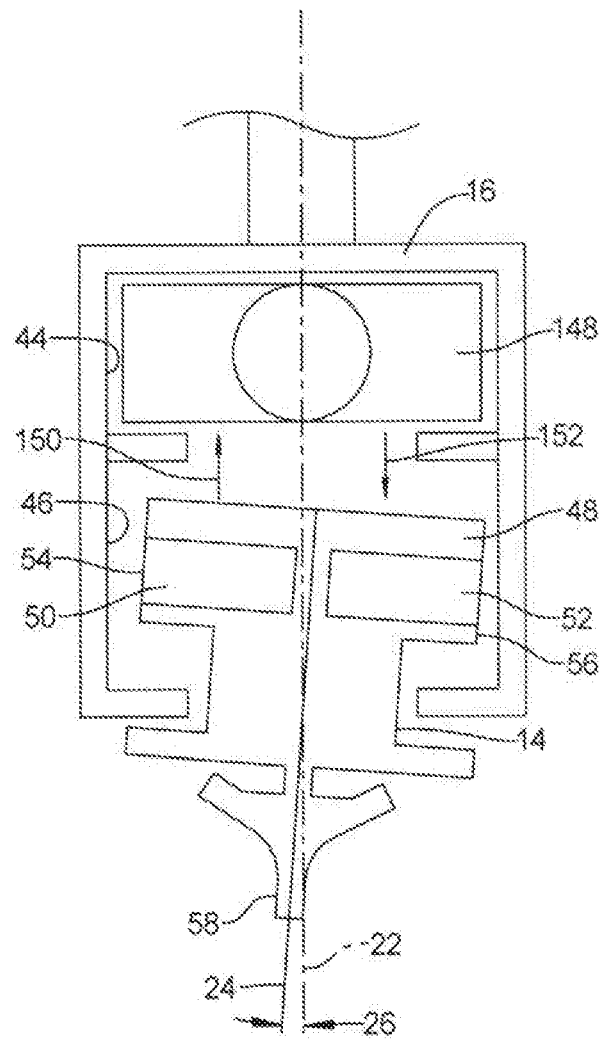
FIG. 9C is a sectional view taken along line 9B-9B in FIG. 9A, wherein the wiper blade is aligned with an axis at an angle relative to a vertical axis through the wiper arm.

Referring to FIG. 9A, FIG. 9B and FIG. 9C, in another exemplary embodiment, the actuator 18 is adapted to selectively induce rotation of the wiper blade 14 independently of movement of the wiper arm 12 with electric coils 148. The actuator 18 includes a first electric coil 148A positioned on the wiper arm 12 adjacent the first distal end 28 of the wiper blade 14, and a second electric coil 148B positioned on the wiper arm 12 adjacent the second distal end 30 of the wiper blade 14. The first and second electric coils 148A, 148B are adapted to induce a twist to the first and second distal ends 28, 30 of the wiper blade 14, inducing rotation of the wiper blade 14 along a longitudinal axis 20 relative to the wiper arm 12.

In another exemplary embodiment, a plurality of intermediate electric coils 148C are spaced along the wiper arm 12 adjacent the wiper blade 14 between the first and second electric coils 148A, 148B. Each of the first, second and the plurality of intermediate electric coils 148A, 148B, 148C is adapted to induce a twist to the wiper blade 14 and, collectively, induce rotation of the wiper blade 14 along a longitudinal axis 20 relative to the wiper arm 12.

Referring to FIG. 9B, each of the double claw fixtures 16 defines a first channel 44 and a second channel 46. The first channel 44 is adapted to slidably and rotatably support the wiper blade 14. The second channel 46 is adapted to accommodate the first, second and intermediate electric coils 148A, 148B, 148C. When the electric coils 148A, 148B, 148C are not actuated, the wiper blade 14 rests within the first channel 44 of the double claw fixtures 16 in alignment with the vertical axis 22 extending through the wiper arm 12, as shown in FIG. 9B. When the electric coils 148A, 148B, 148C are engaged, the electric coils 148A, 148B, 148C create a magnetic field and engage the metallic splines 50, 52 within the wiper blade 14. The electric coils 148A, 148B, 148C create an electromagnetic field that attracts the first metallic spline 50 on one side of the wiper blade 14, as indicated by arrow 150, and repels the second metallic spline 52 on the opposite side of the wiper blade 14, as indicated by arrow 152. The opposing attract/repel actions of the electric coils 148A, 148B, 148C causes the wiper blade 14 to rotate within the first channel 44 of the double claw fixtures 16, as shown in FIG. 9C.

A windshield wiper assembly 10 of the present disclosure offers the advantage of being able to automatically or selectively control the attack angle of the wiper blade on the windshield. This can be accomplished by controlling the attack angle of the wiper blade 14 based on the position of the wiper arm 12 as the wiper arm 12 pivots operationally across the windshield, or by controlling the attack angle of the wiper blade 14 based on input from a controller 138 that selectively controls the attack angle independently of the radial position of the wiper arm 12.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A windshield wiper assembly for an automobile, comprising:
   a wiper arm;
   a wiper blade having first and second distal ends;
   a plurality of double claw fixtures pivotally mounted onto the wiper arm and adapted to support the wiper blade on the wiper arm; and
   an actuator including a first push rod having a first distal end engaging the first distal end of the wiper blade and a second push rod having a first distal end engaging the second distal end of the wiper blade, wherein the actuator is adapted to selectively push the first push rod toward the first distal end of the wiper blade and to push the second push rod toward the second distal end of the wiper blade to twist the first and second distal ends of the wiper blade to induce rotation of the wiper blade along a longitudinal axis of the wiper blade relative to the wiper arm, each of the double claw fixtures adapted to rotatably support the wiper blade.

2. The windshield wiper assembly of claim 1, wherein the first distal end of the wiper blade includes a first twist block and the second distal end of the wiper blade includes a second twist block, the first distal end of the first push rod in sliding engagement with the first twist block and the first distal end of the second push rod in sliding engagement with the second twist block, wherein movement of the first distal end of the first push rod relative to the first twist block induces rotation of the first twist block and the first distal end of the wiper blade and movement of the first distal end of the second push rod relative to the second twist block induces rotation of the second twist block and the second distal end of the wiper blade.

3. The windshield wiper assembly of claim 2, wherein each of the double claw fixtures defines a first channel and a second channel, the first channel adapted to slidably and rotatably support the wiper blade, the second channel adapted to accommodate the first and second push rods.

4. The windshield wiper assembly of claim 3, wherein the first and second twist blocks each include opposing ramped portions, the first distal end of the first push rod engaging the ramped portions of the first twist block and the first distal end of the second push rod engaging the ramped portions of the second twist block.

5. The windshield wiper assembly of claim 4, wherein the second channel within each of the double claw fixtures is adapted to slidably support the first and second push rods and to prevent rotation of the first and second push rods relative to the wiper arm, further wherein when the first distal end of the first push rod engages the ramped portions of the first twist block, the first twist block rotates relative to the first distal end of the first push rod, and when the first distal end of the second push rod engages the ramped portions of the second twist block, the second twist block rotates relative to the first distal end of the second push rod.

6. The windshield wiper assembly of claim 5, wherein the actuator further includes a lever hub pivotally mounted to the wiper arm between the first and second distal ends of the wiper blade, the lever hub including a first lever arm extending from the lever hub and a second lever arm extending from the lever hub, opposite the first lever arm, a second distal end of the first push rod pivotally attached to the first lever arm and a second distal end of the second push rod pivotally attached to the second lever arm, the actuator further including a third push rod having a first distal end pivotally attached to the first lever arm, wherein when the third push rod slides toward the lever hub the lever hub rotates and the first lever arm pushes the first push rod toward the first distal end of the wiper blade and the second lever arm pushes the second push rod toward the second distal end of the wiper blade.

7. The windshield wiper assembly of claim 6, wherein the first distal end of the third push rod is removably attached to the first lever arm of the lever hub.

8. The windshield wiper assembly of claim 7, wherein the first distal end of the third push rod is secured to the first lever arm of the lever hub by a pin, the pin being secured therein by one of a c-clip and a cotter pin.

9. The windshield wiper assembly of claim 8, wherein the first distal end of the third push rod includes a rubber boot adapted to removably cover the lever hub and the pivotal attachments of the second distal end of the first push rod to the first lever arm, the second distal end of the second push rod to the second lever arm, and the first distal end of the third push rod to the first lever arm.

10. The windshield wiper assembly of claim 6, wherein the actuator is adapted to automatically induce rotation of the wiper blade based on movement of the wiper arm.

11. The windshield wiper assembly of claim 10, wherein the actuator further includes a cam mechanism in engagement with a second distal end of the third push rod, wherein the cam mechanism induces movement to the third push rod as the windshield wiper arm moves during operation of the windshield wiper assembly.

12. The windshield wiper assembly of claim 6, wherein the actuator is adapted to selectively induce rotation of the wiper blade independently of movement of the wiper arm.

13. The windshield wiper assembly of claim 12, further including a programmable controller, the controller adapted to control the actuator and the rotational position of the wiper blade relative to the wiper arm.

14. The windshield wiper assembly of claim 13, wherein the actuator includes an electrical linear actuator adapted to selectively induce linear movement to the second distal end of the third push rod.

15. The windshield wiper assembly of claim 13, wherein the actuator includes one of an electric, hydraulic and pneumatic cylinder adapted to selectively induce linear movement to the second distal end of the third push rod.

16. A windshield wiper assembly for an automobile, comprising:
a wiper arm;
a wiper blade having first and second distal ends;
a plurality of double claw fixtures pivotally mounted onto the wiper arm, wherein each fixture is adapted to rotatably support the wiper blade on the wiper arm;
an actuator adapted to selectively twist the first and second distal ends of the wiper blade to induce rotation of the wiper blade along a longitudinal axis of the wiper blade relative to the wiper arm; and
the wiper blade includes metallic splines extending longitudinally from the first distal end of the wiper blade to the second distal end of the wiper blade, the actuator including a first electric coil positioned on the wiper arm adjacent the first distal end of the wiper blade and a second electric coil positioned on the wiper arm adjacent the second distal end of the wiper blade, the first and second coils adapted to induce the twist to the first and second distal ends of the wiper blade, inducing the rotation of the wiper blade along the longitudinal axis relative to the wiper arm.

17. The windshield wiper assembly of claim 16, further including a plurality of intermediate electric coils spaced along the wiper arm adjacent the wiper blade between the first and second electric coils, each of the first, second and the plurality of intermediate electric coils adapted to induce a twist to the wiper blade and, collectively, induce rotation of the wiper blade along a longitudinal axis relative to the wiper arm.

18. The windshield wiper assembly of claim 17, wherein each of the double claw fixtures defines a first channel and a second channel, the first channel adapted to slidably and rotatably support the wiper blade, the second channel adapted to accommodate the first, second and intermediate electric coils.

* * * * *